F. M. STRONG & J. W. FERGUSON.
WATER SOFTENER.
APPLICATION FILED JULY 31, 1911.
1,048,757.
Patented Dec. 31, 1912.
2 SHEETS—SHEET 1.
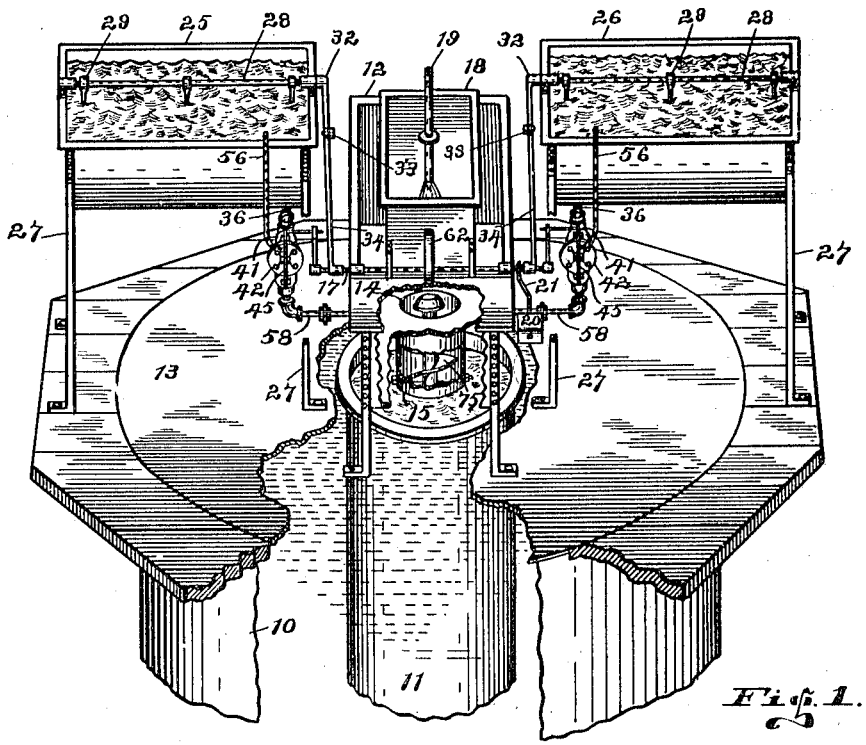

F. M. STRONG & J. W. FERGUSON.
WATER SOFTENER.
APPLICATION FILED JULY 31, 1911.

1,048,757.

Patented Dec. 31, 1912.

2 SHEETS—SHEET 2.

Witnesses:
Adelaide Kearns
Clara Dilke

Inventors
Frederick M. Strong and
James W. Ferguson,
By James A. Walsh,
Attorney.

UNITED STATES PATENT OFFICE.

FREDERICK M. STRONG, OF INDIANAPOLIS, AND JAMES W. FERGUSON, OF RICHMOND, INDIANA.

WATER-SOFTENER.

1,048,757.  Specification of Letters Patent.  Patented Dec. 31, 1912.

Application filed July 31, 1911. Serial No. 641,594.

*To all whom it may concern:*

Be it known that we, FREDERICK M. STRONG, residing at Indianapolis, in the county of Marion and State of Indiana, and JAMES W. FERGUSON, residing at Richmond, in the county of Wayne and State of Indiana, citizens of the United States, have invented certain new and useful Improvements in Water-Softeners, of which the following is a specification.

In the operation of mechanical water softeners for laundries and other purposes much difficulty is experienced in properly supplying chemicals, usually lime and soda ash in solution, in requisite proportions to effectively treat the varying conditions of the water, which undergoes chemical change in a short time from natural causes, requiring a greater or less amount of lime, or of soda ash, under certain conditions, or a combination of both under other conditions.

The object of our invention is to provide means under instant and positive control whereby either of said solutions can be readily administered separately, or in combination, in predetermined proportions whenever the condition of the water becomes changed, and to otherwise improve the common type of water softener now in use, all as will be hereinafter more particularly pointed out.

Figure 3:
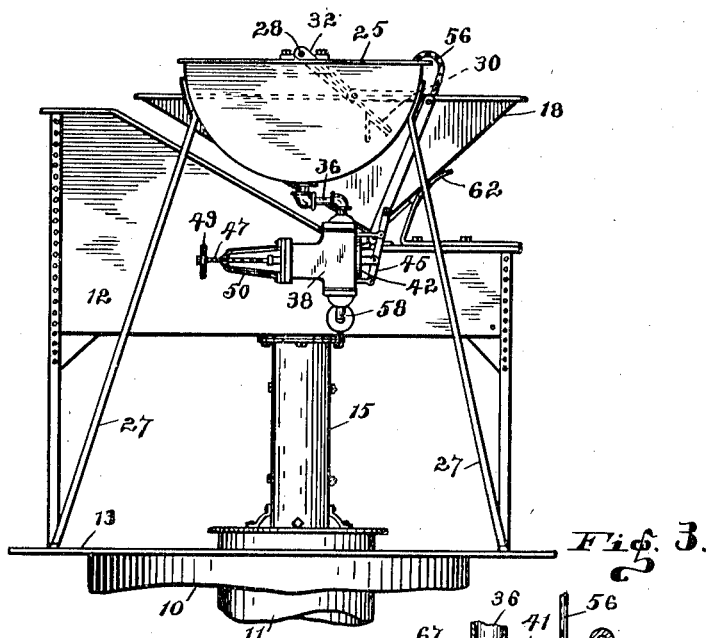
Figure 4:
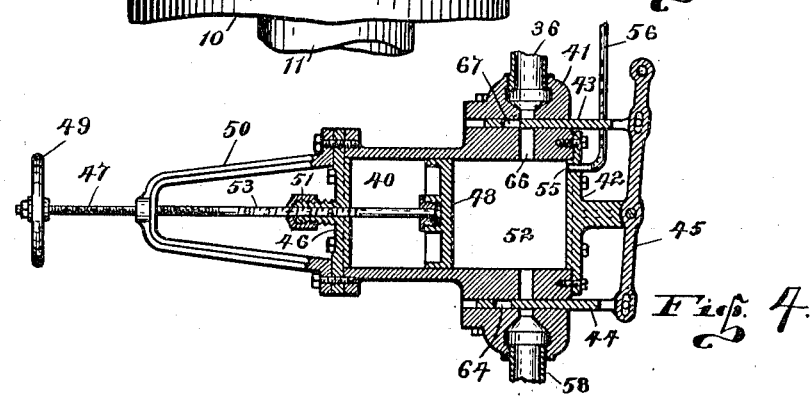
Figure 5:
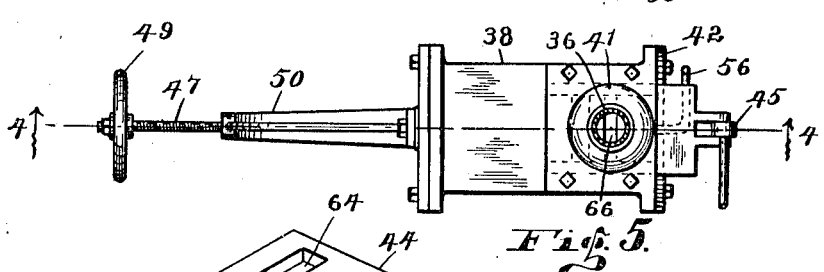
Figure 6:
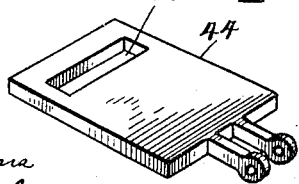

In the accompanying drawings, which are made a part hereof, Figure 1 is a perspective view of our invention associated with a precipitating tank, portions of the latter being broken away to show the interior arrangement; Fig. 2, a detail central vertical sectional view; Fig. 3, a side elevation illustrating the application of our improved measuring valve in connection with the mixing chamber; Fig. 4 a central sectional view of said valve; Fig. 5, a plan thereof, and Fig. 6 a perspective of one of the slide valves forming part of our improved valve structure.

The precipitating tank, 10, and down spouting, 11, are of a common and well known construction and arrangement, and will not be referred to further herein except incidentally in describing our invention.

The mixing chamber, 12, is suitably supported by a frame or otherwise upon the top, 13, of tank 10, and communicates through an opening, 14, with an agitating tube, 15, through which the treated water is precipitated and discharged into down spouting 11. Suitably mounted upon said mixing chamber 12 is a rock-shaft, 17, upon which is mounted a bucket, 18, of any desired formation adapted to be tilted by the weight of the water flowing thereinto through inlet pipe, 19, or otherwise, and to dump the same into said mixing chamber 12, said bucket being returned to its normal position by means of a weight, 20, connected to said rock-shaft by an arm, 21, which weight may be so adjusted along said arm as to permit the dumping of said bucket when containing varying amounts of water.

At each side of the mixing chamber 12 we mount chemical solution tanks, 25, 26, upon suitable legs, 27, or otherwise, which tanks preferably are of the form shown in Fig. 3, each being provided with a rock-shaft, 28, bearing arms, 29, supporting a paddle, 30, which rock-shaft is operated to cause said paddle to stir the chemical solutions in said tanks by the movements of arms, 32, link, 33, and arm, 34, which latter is connected to rock-shaft 17 which receives its motion from the reverse movements of tilting bucket 18 while dumping and returning to normal position. Leading from each of said solution tanks is a pipe, 36, which discharges into our improved measuring valve, 38, which valve may be readily adjusted as to receive only the exact predetermined quantity of chemical solution desired. Said valve 38 comprises a suitable chamber, 40, having a cap, 41, to the end of which is secured a head, 42, in which cap are slide-valves, 43, 44, controlled by lever, 45, pivotally mounted on said head 42 and connected to rock-shaft 17. At the opposite end said valve chamber is provided with a head 46 in which is mounted a screw-rod, 47, having a plunger, 48, at the end thereof, said screw-rod being manipulated by a hand-wheel, 49, and preferably supported by a brace, 50, and having a suitable packing-box, 51, to prevent leakage. By turning said rod, plunger 48 may be moved back and forth in said chamber, as desired, to enlarge or diminish the size of compartment 52 to contain the exact quantity of chemical solution which it has been determined is requisite for the treatment of water, the proper position of said plunger to measure the desired quantity being determined by a reading of a scale, as 53, on screw-shaft 47, or any suitable indicator for the purpose. To insure the proper filling of said compartment we provide a vent, 55, to which is connected pipe, 56, which leads to a chemical tank or otherwise as may be desired. Communicating with slide-valve 44 is an outlet pipe, 58, through which the chemical solution is conveyed to mixing chamber 12.

In operation, each of the solution tanks 25, 26, may be supplied with a chemical solution, such as lime in one and soda ash in the other, by any suitable means. When bucket 18 is supplied with the desired quantity of water it by gravity tilts, as indicated by dotted lines in Fig. 2, until its discharging end strikes buffer, 60, and when emptied is caused by weight 20 to return to the position indicated in full lines in said Fig. 2, ready for re-charging, its movement from normal position being prevented by buffer, 62. As said bucket is dumping, rock-shaft 17 imparts motion to stirring paddle 30 to agitate the solution, and also actuates lever 45 in a direction to cause the opening 64 in slide-valve 44 to register with outlet opening 65, at the same time throwing slide-valve 43 inwardly to tightly close opening 66 so that compartment 52 empties into mixing chamber 12 simultaneously with the discharge of water from bucket 18, and upon the return movement of said bucket to normal position the movement of rock-shaft 17 is reversed so that it in turn reverses the movement of lever 45 to draw slide-valve 43 outwardly so that its opening 67 will register with outlet opening 66 to permit the inflow of chemical solution while bucket 18 is being filled, and at the same time throws slide-valve 44 in to prevent the escape of solution, the movement of said slide-valves being so timed as to insure that one will be absolutely closed before the other begins to open. It will be understood, of course, that when bucket 18 is in normal position rock-shaft 17 has thrown lever 45 in position to open valve 43 so that compartment 52 is being filled with solution while said bucket is being filled with water. In this manner, where the water is of such nature as to require equal or unequal proportions of two different chemical solutions for softening, the valves may be quickly adjusted to hold just exactly the required amount of each solution, so that when bucket 18 is tilted to discharge a predetermined quantity of water each of said valves at the same time discharges its quota of solution, the result being that all of the fluids are discharged into mixing chamber 12 together and thus become thoroughly commingled. In some localities water so varies in its conditions that at times one or the other of the solutions mentioned are sufficient to produce the desired softening, while again, upon sudden change because of rains or otherwise, both solutions are required in proportions to be promptly determined, which in many instances is impossible where it is attempted to unite both solutions in a single receptacle, but by employing and operating two solution tanks and controlling their discharge by our improved valves in the manner described we are enabled to quickly change and supply the necessary proportions to meet the conditions presented in waters of such characteristics. However, as will be also understood, in such localities where it has been positively determined that a certain chemical solution is sufficient at all times to satisfactorily treat water undergoing changed conditions, requiring only an increase or decrease in the proportions thereof, we contemplate employing but a single solution tank the discharge thereof to be regulated in requisite proportions by our improved valve. Said valve is very simple in construction and arrangement and may be readily disassembled for the repair of any of its parts, and is of much advantage for the purpose employed in that the accumulation and adhesion of sediment and consequent impairment is obviated, as there are no delicate interior parts which are subject to wear from the gritty substance contained in lime and soda ash, and as the slide-valves are repeatedly worked back and forth to keep them clean the accumulation of matter thereon is thus prevented.

After the water and chemical solution have been commingled in the manner described, to insure a further mixture of the same I provide a spiral baffle, 75, in agitating tube 15 between opening 14 in the mixing chamber 18 and down spouting 11 over the convolutions of which baffle the treated water will fall in a scattered and irregular manner so that the water and its ingredients will become more thoroughly mixed.

We claim as our invention:

1. The combination, in a water softener, of a solution tank, a mixing chamber, an outlet pipe leading from said tank, an inlet pipe communicating with said mixing chamber, and a valve connecting said pipes comprising an adjustable fluid containing chamber, a slide-valve for controlling the flow of fluid thereinto, a slide-valve for controlling the discharge of fluid therefrom, and means connecting said slide-valves for simultaneously opening one and closing the other.

2. The combination, in a water softener, of a solution tank, a mixing chamber, an outlet pipe leading from said tank, an inlet pipe communicating with said mixing chamber, and a valve connecting said pipes comprising a chamber, a fluid-tight plunger in said chamber, means for adjusting said plunger and fixedly holding the same in predetermined positions to increase and diminish the fluid-containing portion of said chamber, means for controlling the inflow of solution into said chamber, and means for controlling the discharge of solution therefrom.

3. The combination, in a water softener, of a mixing chamber, a tilting bucket adapted to discharge into said chamber, solution tanks at each side of said bucket, pipes communicating with said chamber and each of said tanks said pipes being provided with adjustable measuring valves, means for tilting said bucket and opening said valves, and means for returning said bucket to normal position and closing said valves.

4. The combination, in a water softener, of a mixing chamber, a tilting bucket associated therewith, a solution tank at each side of said bucket, pipes communicating with said chamber and each of said tanks, adjustable valves associated with said pipes whereby varied proportions of the solutions in the respective tanks may be measured and discharged into said chamber, means for simultaneously actuating said tilting bucket and opening said valves, and a spiral baffle communicating with said chamber through which treated water may be further mixed after leaving said tank.

5. The combination, in a water softener, of a solution tank, a mixing chamber, an outlet pipe leading from said tank, an inlet pipe communicating with said mixing chamber, and a valve connecting said pipes comprising a chamber, a plunger in said chamber, a rod connected to said plunger for adjusting the same, a brace for supporting said rod, means for controlling the inflow of solution into said chamber, means for controlling the discharge of solution therefrom, and means for simultaneously operating said controlling means.

6. The combination, in a water softener, of a solution tank, a mixing chamber, an outlet pipe leading from said tank, an inlet pipe communicating with said mixing chamber, and a valve connecting said pipes comprising a chamber having inlet and outlet openings, a head at one end of said chamber, slide-valves for controlling said openings, a lever pivotally connected to said head and said slide-valves for opening and closing the same, a head at the opposite end of said chamber, a plunger in said chamber, and means connected to said plunger and passing through said last mentioned head whereby said plunger may be adjusted to increase and diminish the capacity of said chamber.

7. The combination, in a water softener, of a solution tank, a mixing chamber, an outlet pipe leading from said tank, an inlet pipe communicating with said mixing chamber, and a valve connecting said pipes comprising a chamber having a vent therein, a slide-valve for controlling the inflow of solution into said chamber, a slide-valve for controlling the discharge of solution therefrom, means for simultaneously adjusting said slide-valves, a plunger in said valve chamber, and means for adjusting said plunger to increase and diminish the capacity of said chamber.

8. The combination, in a water softener, of a mixing chamber, a receptacle adapted to discharge into said chamber, solution tanks adjacent said receptacle, pipes communicating with said chamber and each of said tanks said pipes being provided with adjustable measuring valves, and means for actuating said receptacle to open and close said valves.

9. The combination, in a water softener, of a mixing chamber, a tilting bucket associated therewith, solution tanks adjacent said bucket, pipes communicating with said chamber and said tanks, adjustable valves associated with said pipes whereby varied proportions of the solutions in said tanks may be measured and discharged into said chamber, and means for actuating said valves to permit or prevent the flow of solutions thereinto.

10. The combination, in a water softener, of a solution tank, a mixing chamber, an outlet pipe leading from said tank, an inlet pipe communicating with said chamber, a valve connecting said pipes comprising a chamber, a plunger in said chamber, means for adjusting and fixedly holding said plunger in predetermined positions in said chamber, and means for controlling the flow of fluid into said chamber.

In testimony whereof we affix our signatures in presence of two witnesses.

FREDERICK M. STRONG.
JAMES W. FERGUSON.

Witnesses:
J. A. WALSH,
WALTER J. TINGLE.